June 27, 1939.　　K. SCHNEIDER ET AL　　2,164,024
ELECTRIC ARC FURNACE
Filed Nov. 27, 1936

Kurt Schneider  
Hermann Schunck  Inventors

By Their Attorneys

Patented June 27, 1939

2,164,024

UNITED STATES PATENT OFFICE 2,164,024

ELECTRIC ARC FURNACE

Kurt Schneider and Herman Schunck, Bitterfeld, Germany, assignors to I. G. Farbenindustrie Aktiengesellschaft, Frankfort-on-the-Main, Germany Application November 27, 1936, Serial No. 112,916
In Germany December 7, 1935

6 Claims. (Cl. 13—11)

This invention relates to electric arc furnaces.

Electric arc furnaces with metal electrodes have already been proposed for carrying out reactions in the gaseous phase, such as the fixation of atmospheric nitrogen on the large scale, whilst, in order to prevent overheating at the focal point, the precaution is adopted of displacing the focus along the electrode, either by moving, for example rotating, the electrode, or by suitably blowing the arc by means of a current of gas or magnetically. So far, however, this method has not been applied to the performance of reactions in closed electric furnaces—and therefore to smelting processes, and to reactions between substances in the liquid or solid phase—apparently owing to the consideration that moving the electrodes in closed electric furnaces is faced by insuperable difficulties; whereas, on the other hand, for practical reasons, blowing the arc by means of electromagnets located in its vicinity, did not seem feasible.

The difficulties of such application are still further increased by the circumstance that, in the case of reactions in the gaseous phase, it is sufficient to maintain, in the immediate environment of the arc, i. e., in the actual reaction zone, the high temperatures generated by the arc, whilst the remaining portion of the furnace, and more particularly the walls, can be cooled. In reactions in which solid, or liquid, substances are involved, it is, however, essential to maintain, as far as possible, a uniformly high temperature throughout the furnace. This consideration therefore also prevents blowing the arc by means of a current of gas, as was already proposed in the case of reactions in the gaseous phase because of the heat losses thereby entailed.

The present invention aims at overcoming the foregoing drawbacks and to this end provides an electric arc furnace for the performance of reactions, between substances in the liquid or solid phase, with the aid of metal electrodes in which the blowing of the arc is effected by a magnetic field generated outside the shell of the furnace.

In order more clearly to understand the invention, reference is made to the accompanying drawing, which illustrates diagrammatically and by way of example, one embodiment of furnace in accordance therewith, and in which.

Figure 1:
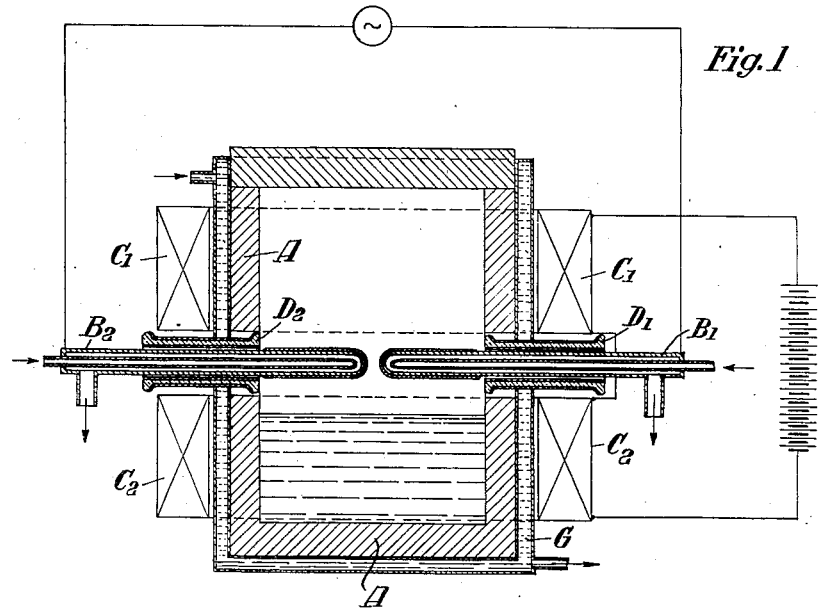
Fig. 1 is a section.

Referring to Fig. 1, A denotes the shell of the furnace, through which the water-cooled electrodes $B_1$ and $B_2$ are introduced. The arc-blowing field is generated by a two-part cylindrical coil, $C_1$ and $C_2$, located outside the shell of the furnace. In order to enable the halves of the coil to be set close together in the most advantageous position from the electromagnetic standpoint when the furnace is to be started up by high-frequency current, metallised ceramic guide sleeves $D_1$ and $D_2$, for the passage of the electrodes are provided in the shell of the furnace, their inner metal facing being connected with the electrodes, and the outer facing with the shell of the furnace. In this manner, the striking-over of the high-frequency ignition current to the shell, and the glowing of the guide sleeves, are prevented.

The fixed arrangement of the electrodes, customary in the case of furnaces for carrying out reactions in the gaseous phase, is impracticable in the case of furnaces for the treatment of solid or liquid substances, because the gap between the electrodes must be kept small, in view of starting the furnace from cold. Since both the heat radiated from the interior of the furnace to the electrodes, and the heat transmitted from the highly heated focus to the electrodes, are led away, as waste heat, by the cooling medium, the utilisation of the heat would be extremely unfavourable in the case of a small arc gap and correspondingly longer extension of the electrodes into the interior of the furnace. In order to obviate this defect, it has been found advantageous to arrange for a longitudinal movement of the electrodes, in such a manner that, in starting the furnace, they can be brought sufficiently close together for ignition to take place, or enable the arc to be struck, even when the furnace is comparatively cold, whilst the gap between them can be considerably increased as the temperature continues to rise. Experiment has shown that, when the furnace is running, the electrodes can be drawn out to such an extent that the gap is many times as wide as that needed for starting, and that, in consequence, the losses due to radiation into the electrodes can, in particular, be reduced without disturbing the development of the aura of the arc. At the same time, the relation between the energy of the focus and that of the arc is modified substantially in favour of the latter.

A further reduction in the heat losses—which, as already mentioned, are mainly determined by the heat led away from the focus—can be obtained by employing, for the electrode material, metals with the lowest possible thermal conductivity, or by coating the electrodes with a layer of low thermal conductivity, such as oxides or the like. It will be sufficient to apply this layer only to such portions of the electrodes as still project into the furnace when in continuous operation, that is to say, when the electrodes are drawn out to the full extent.

It is known that iron and alloys thereof have not proved to be suitable electrode materials in the case of arc furnaces for reactions in the gaseous phase. This has now been found due to the circumstance that, with the arrangement, then employed, of the poles of the blowing magnet in the immediate vicinity of the arc, a highly non-uniform magnetic field was generated, which was distorted, by the iron electrodes, in such a manner as to exert an unfavourable influence on the blowing action near the tips of the electrodes. By generating the blowing field outside the furnace, in accordance with the present invention, however, an extremely uniform magnetic field is produced, which has proved specially advantageous when iron and alloys thereof are employed as electrode material, the cooling losses in the case of iron electrodes being only about half those in the case of copper electrodes.

In starting up the furnace, the ignition of the arc is preferably effected by the known high-frequency method, since that alone enables the ignition to continue until the furnace temperature is sufficient to enable the arc to be spontaneously ignited by the working voltage. With the simplest form of high-frequency ignition, with strongly damped oscillations, it is advisable to take the primary current from the working current. In so doing, however, it has transpired, that, notwithstanding a sufficient strength of the spark, the ignition fails to occur if the phase relation between the mains voltage applied to the arc and the damped trains of waves of the simultaneously applied high-frequency voltage is unfavourable, for example, when the peak value of the high-frequency voltage coincides with the zero value of the working voltage. According to the present invention therefore, the phase of the voltage serving to energise the impulse spark gap is adapted to be displaced in relation to the phase of the arc voltage, for example by means of an adjustable transformer or induction regulator H.

In the arrangement illustrated in Fig. 1, the capacity of the guide sleeves $D_1$ and $D_2$ generally prevents the formation of the ignition spark between the electrodes, because it short-circuits the high-frequency voltage by way of the shell to the furnace, and, as a rule, it is also impossible to reduce the ignition frequency to such an extent that the influence of said capacity disappears.

Figure 2:
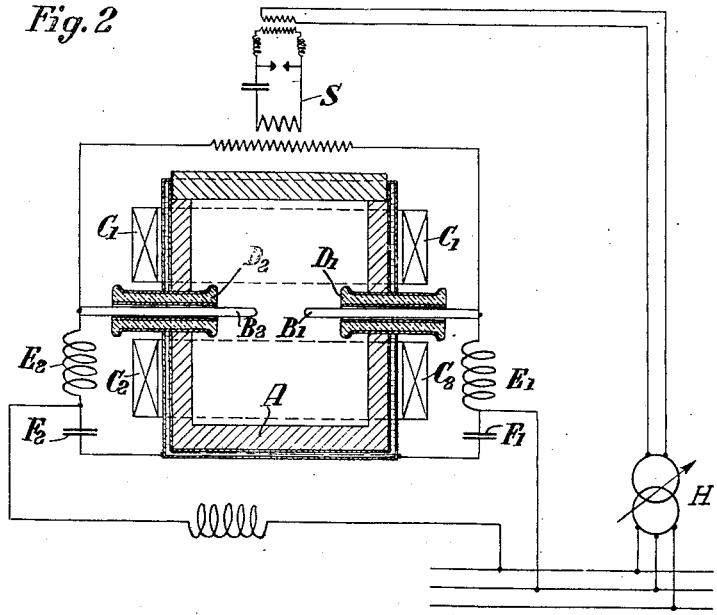
Fig. 2 is a diagram of the electrical connections of the furnace.

Nevertheless this influence can be removed in accordance with the present invention as shown in Fig. 2, by connecting, in parallel, the tuned choke coils $E_1$ and $E_2$, which form, with the guide-sleeve capacities $D_1$ and $D_2$, blocking circuits for the high-frequency voltage. In order to prevent these chokes from short-circuiting the working current, they are connected with a metallic water-cooled jacket G surrounding, in known manner the shell A of the furnace through large blocking condensers $F_1$ and $F_2$. The chokes are employed, at the same time, to shut off the high-frequency ignition circuit from the mains circuit. S denotes the secondary coil of the Tesla transformer serving to ignite the arc.

We claim:

1. A furnace for the performance of smelting processes and reactions in the solid or liquid phases, comprising a closed smelting or reaction chamber adapted to receive a solid or molten charge, at least one pair of metal electrodes disposed therein in substantial alignment and above the level of such charge, and at least one pair of coreless electric coils surrounding said furnace and disposed symmetrically to said electrodes in such a manner that the common axis of both coils is perpendicular to the line defined by said electrodes.

2. A furnace for the performance of smelting processes and reactions in the solid or liquid phases, comprising a closed smelting or reaction chamber adapted to receive a solid or molten charge, at least one pair of metal electrodes disposed therein in substantial alignment and above and substantially parallel to the level of such charge, and at least one pair of coreless electric coils surrounding said furnace and disposed symmetrically to said electrodes in such a manner that the common axis of both coils is perpendicular to the line defined by said electrodes.

3. A furnace for the performance of smelting processes and reactions in the solid or liquid phases, comprising a closed smelting or reaction chamber adapted to receive a solid or molten charge, at least one pair of metal electrodes disposed therein in substantial alignment and above and substantially parallel to the level of such charge and adapted to be moved in a longitudinal direction, and at least one pair of coreless electric coils surrounding said furnace and disposed symmetrically to said electrodes in such a manner that the common axis of both coils is perpendicular to the line defined by said electrodes.

4. A furnace for the performance of smelting processes and reactions in the solid or liquid phases, comprising a closed smelting or reaction chamber adapted to receive a solid or molten charge, at least one pair of metal electrodes disposed therein in substantial alignment and above the level of such charge, at least one pair of coreless electric coils surrounding said furnace and disposed symmetrically to said electrodes in such a manner that the common axis of both coils is perpendicular to the line defined by said electrodes, high frequency transformer means, for causing ignition of the arc, deriving the primary current from the working current passing through and between said electrodes, and means for shifting the phase of the voltage of said primary current in relation to the phase of the voltage of said working current.

5. A furnace for the performance of smelting processes and reactions in the solid or liquid phases, comprising a closed smelting or reaction chamber adapted to receive a solid or molten charge, at least one pair of metal electrodes disposed therein in substantial alignment and above the level of such charge, guide sleeves having a metallic inner surface surrounding said electrodes at their point of entrance into the furnace, at least one pair of coreless electric coils surrounding said furnace and disposed symmetrically to said electrodes in such a manner that the common axis of both coils is perpendicular to the line defined by said electrodes, high frequency transformer means for causing ignition of the arc, and choke coils connected in parallel with the capacity of said guide sleeves, said choke coils being of such dimensions as to form, in conjunction with said capacity, a tuned rejector circuit for the high frequency voltage of the ignition current.

6. A furnace for the performance of smelting processes and reactions in the solid or liquid phases, comprising a closed smelting or reaction chamber adapted to receive a solid or molten charge, at least one pair of metal electrodes disposed therein in substantial alignment and above the level of such charge, guide sleeves having a metallic inner surface surrounding said electrodes at their point of entrance into the furnace, at least one pair of coreless electric coils surrounding said furnace and disposed symmetrically to said electrodes in such a manner that the common axis of both coils is perpendicular to the line defined by said electrodes, high frequency transformer means, for causing ignition of the arc, deriving the primary current from the working current passing through and between said electrodes, choke coils connected in parallel with the capacity of said guide sleeves, said choke coils being of such dimension as to form, in conjunction with said capacity, a tuned rejector circuit for the high frequency voltage of the ignition current, and means for shifting the phase of the voltage of said primary current in relation to the phase of the voltage of said working current.

KURT SCHNEIDER.
HERMAN SCHUNCK.